United States Patent
Xiong et al.

(10) Patent No.: US 10,838,424 B2
(45) Date of Patent: Nov. 17, 2020

(54) CHARGING STATION IDENTIFYING METHOD AND ROBOT

(71) Applicant: UBTECH Robotics Corp, Shenzhen (CN)

(72) Inventors: Youjun Xiong, Shenzhen (CN); Gaobo Huang, Shenzhen (CN); Xiangbin Huang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 211 days.

(21) Appl. No.: 16/116,946

(22) Filed: Aug. 30, 2018

(65) Prior Publication Data

US 2019/0324470 A1 Oct. 24, 2019

(30) Foreign Application Priority Data

Apr. 18, 2018 (CN) .......................... 2018 1 0350021

(51) Int. Cl.
*B25J 9/16* (2006.01)
*G01S 13/42* (2006.01)
*G01S 13/88* (2006.01)
*G05D 1/02* (2020.01)
*B25J 11/00* (2006.01)
(Continued)

(52) U.S. Cl.
CPC .......... *G05D 1/0225* (2013.01); *B25J 9/1694* (2013.01); *B25J 11/008* (2013.01); *B25J 19/027* (2013.01); *G01S 13/426* (2013.01); *G01S 13/881* (2013.01); *G05D 1/0257* (2013.01); *H02J 7/14* (2013.01)

(58) Field of Classification Search
CPC ...... B25J 9/1694; B25J 11/008; B25J 19/027; G01S 7/41; G01S 13/426; G01S 13/88; G01S 13/881; G05D 1/0225; G05D 1/0257; H02J 7/14
See application file for complete search history.

(56) References Cited

U.S. PATENT DOCUMENTS

| | | | |
|---|---|---|---|
| 2009/0043422 A1* | 2/2009 | Lee ...................... | H04N 5/2251 700/245 |
| 2012/0323365 A1* | 12/2012 | Taylor ................... | B25J 19/005 700/259 |
| 2017/0225336 A1* | 8/2017 | Deyle .................. | G08B 13/196 |

(Continued)

FOREIGN PATENT DOCUMENTS

| EP | 3121677 A2 | 1/2017 |
|---|---|---|
| WO | WO2017/037257 A1 | 3/2017 |

*Primary Examiner* — Robert T Nguyen (57) ABSTRACT

The present disclosure relates to robot technology, and particularly to a method and a robot for identifying charging station. The method includes: first, obtaining scanning data produced by a radar of the robot; then, determining whether an arc-shaped object exists in a scanning range of the radar of the robot based on the scanning data; finally, in response to determining that the arc-shaped object exists in the scanning range of the robot, determining that the arc-shaped object is a charging station. Compared with the prior art, the present disclosure substitutes the arc identification for the conventional concave-convex structure identification. Since the surface of the arc is relatively smooth, the data jumps at the intersection of the cross-section will not occur, hence the accuracy of charging station identification can be greatly improved.

8 Claims, 6 Drawing Sheets

(51) Int. Cl.
  *B25J 19/02* (2006.01)
  *H02J 7/14* (2006.01)

(56) References Cited

U.S. PATENT DOCUMENTS

| | | |
|---|---|---|
| 2018/0079081 A1 | 3/2018 | Chen |
| 2018/0246518 A1* | 8/2018 | Vogel .................. G05D 1/0225 |
| 2019/0331767 A1* | 10/2019 | Xiong .................. G01S 13/881 |
| 2020/0030982 A1* | 1/2020 | Xiong .................. B25J 9/1676 |
| 2020/0150676 A1* | 5/2020 | Huang .................. H02J 7/0044 |

* cited by examiner

CHARGING STATION IDENTIFYING METHOD AND ROBOT

CROSS REFERENCE TO RELATED APPLICATIONS

This application claims priority to Chinese Patent Application No. 201810350021.4, filed Apr. 18, 2018, which is hereby incorporated by reference herein as if set forth in its entirety.

BACKGROUND

1. Technical Field

The present disclosure relates to robot technology, and particularly to a method and a robot for identifying charging station.

2. Description of Related Art

With the continuous development of technologies, various types of service robots such as sweeping machines, tour guide robots, shopping guide robots, consulting robots have emerged in succession, and the requirements for the capability of the robots such as longer duty period, increased activity ranges, and extend autonomy duration are increased. Therefore, the automatic recharging technology came into being, which guides a robot to approach a charging station when the robot is low on battery power so as to realize the docking and charging in an automatic manner on the precondition of without human intervention.

Figure 1:
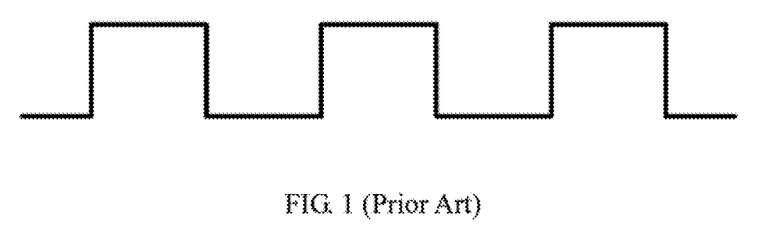
FIG. 1 is a marking structure of a charging station in the prior art.

FIG. 1 is a marking structure of a charging station in the prior art. In the existing solution, in order to facilitate the robot to identify the charging station, a marking structure as shown in FIG. 1 will generally be disposed on the charging station, and the marking structure is generally formed by connecting at least one convex structure and at least one concave structure, and the robot realizes the identification of the charging station by performs matching to the marking structure. However, in the identification process, since data jumps easily occur at the intersection of the cross-section of the convex structure and the concave structure, which causes the low identification accuracy of the charging station.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In order to make the object, features and advantages of the present disclosure more obvious and understandable, the technical solutions in the embodiments of the present disclosure will be clearly and completely described in the following with reference to the accompanying drawings in the embodiments of the present disclosure. Apparently, the described embodiments are merely part of the embodiments of the present disclosure, but not all of the embodiments. All other embodiments obtained by those skilled in the art based on the embodiments of the present disclosure without creative efforts shall fall within the protection scope of the present disclosure.

As used herein, the term "arc-shaped" refers to a segment of a differential curve and/or to a minor arc, which is an angle at the center of the circle that is less than 180 degrees. An "arc-shaped structure" refers to a structure being arc-shaped and may include any three-dimensional structure of any given length. Typically, the arc-shaped structure will be planar to a floor of a building, but the disclosure is not limited thereto.

Figure 2:
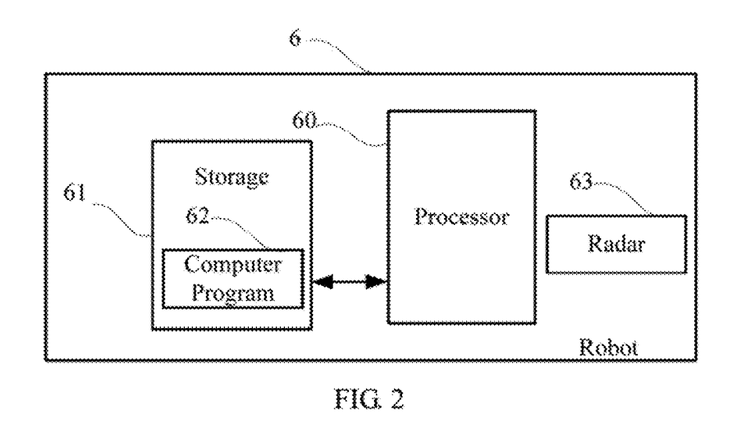
FIG. 2 is a schematic block diagram of a robot according to an embodiment of the present disclosure.

FIG. 2 is a schematic block diagram of a robot according to an embodiment of the present disclosure. As shown in FIG. 2, in this embodiment, a robot 6 may include, but is not limited to, a processor 60, a storage 61, a computer program 62 stored in the storage 61 (e.g., a memory) and executable on the processor 60, and a radar 63. When the processor 60 executes the computer program 62, steps in an embodiment of a charging station identifying method (see FIG. 3) are implemented. Alternatively, when the processor 60 executes the computer program 62, the functions of each of the modules/units in a device embodiment (see FIG. 6) are implemented.

Exemplarily, the computer program 62 may be divided into one or more modules/units, and the one or more modules/units are stored in the storage 61 and executed by the processor 60 to realize the present disclosure. The one or more modules/units may be a series of computer program instruction sections capable of performing a specific function, and the instruction sections are for describing the execution process of the computer program 62 in the robot 6.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the robot 6, for example, a hard disk or a memory of the robot 6. The storage 61 may also be an external storage device of the robot 6, for example, a plug-in hard disk, a smart media card (SMC), a secure digital (SD) card, flash card, and the like, which is equipped on robot 6. Furthermore, the storage 61 may further include both an internal storage unit and an external storage device, of the robot 6. The storage 61 is configured to store the computer program and other programs and data required by the robot 6. The storage 61 may also be used to temporarily store data that has been or will be output.

Figure 3:
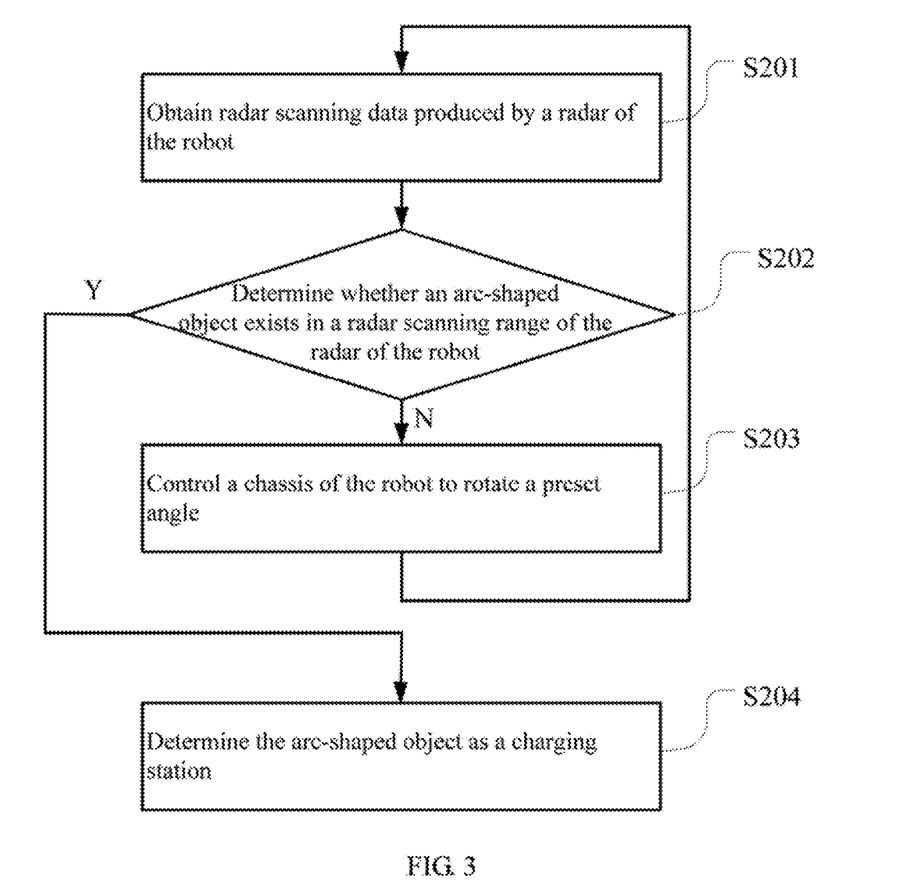
FIG. 3 is a flow chart of a charging station identifying method according to an embodiment of the present disclosure.

FIG. 3 is a flow chart of a charging station identifying method according to an embodiment of the present disclosure. In this embodiment, the method is a computer-implemented method executable for a processor. The charging station identifying method is applied to a robot. As shown in FIG. 3, the method includes the following steps.

S201: obtaining radar scanning data produced by a radar of the robot.

Figure 4:
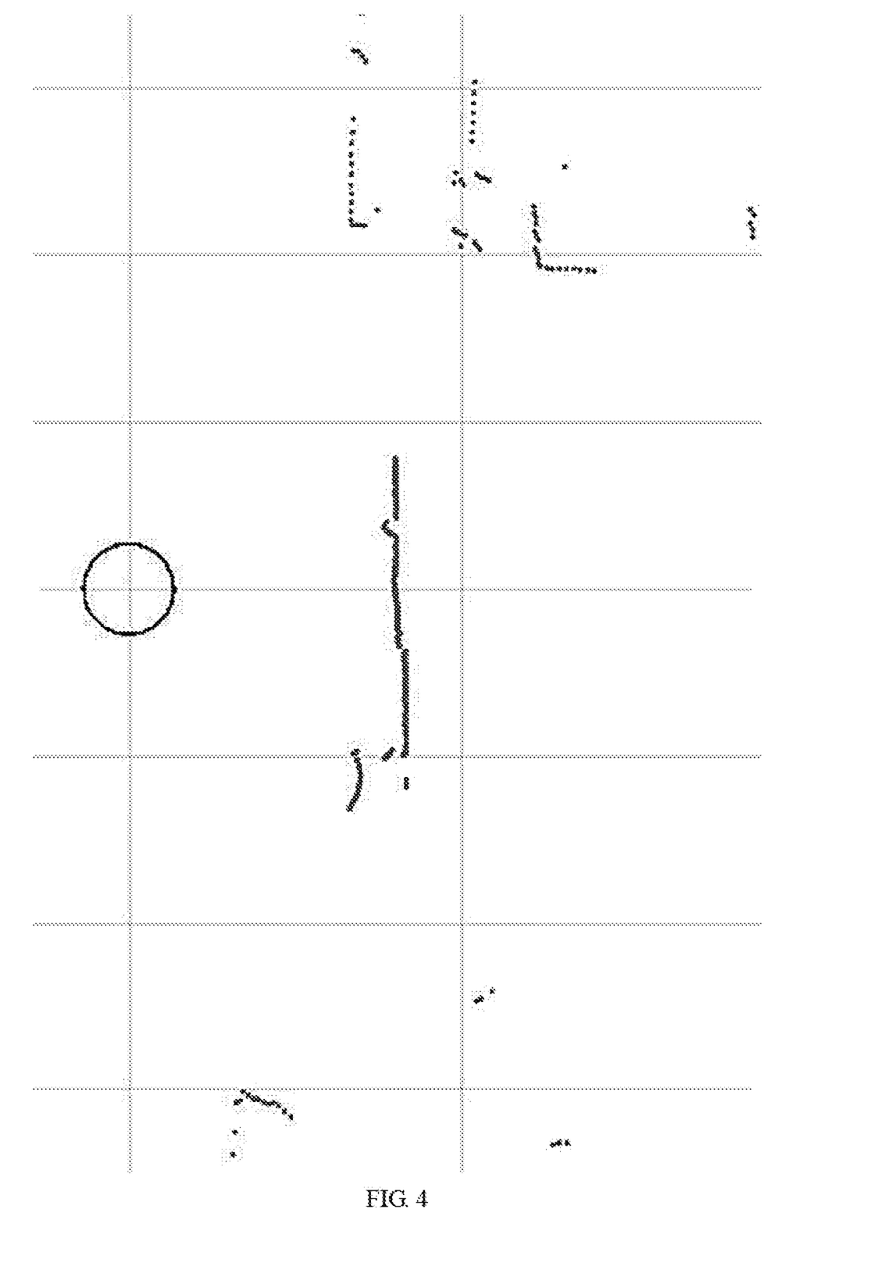
FIG. 4 is radar scanning data of a robot.

FIG. 4 is radar scanning data of the robot. The radar scanning data indicative of one or more objects and an environment surrounding the robot. As shown in FIG. 4, the circle in the figure represents the robot, and the points in the figure are obstacle information obtained by scanning obstacles through the radar of the robot. The higher the angular resolution of the radar, the greater the number of radar scan points for the obstacles of a particular position and size. In this embodiment, for the position of the points scanned by the radar of the robot, a coordinate system with a center of the robot as the origin is used, where a direction in front of the robot is taken as the direction of X-axis, and a direction in the 90 degrees' counter-clockwise rotation of the X-axis is taken as the direction of Y-axis.

S202: determining whether an arc-shaped object exists in a radar scanning range of the radar of the robot based on the radar scanning data.

Specifically, first, obtaining one or more sampling points from the radar scanning data; then, determining whether N sampling points meeting a preset first condition exists, where N is an integer greater than 1, and the specific value may be determined according to actual needs, for example, it can be set to 10, 20, 30, and the like.

The first condition is a sum of an absolute value of one or more first error values being less than a preset first threshold, the first error value is a difference of a distance between each of the one or more sampling points and a reference point as well as a preset reference distance, and the reference point is any point within the radar scanning range.

If there exists N sampling points meeting the first condition, the following formula is tenable:

$$\sum_{n=1}^{N} Err1_n < \text{Threshold1};$$

that is, the following formula is tenable:

$$\sum_{n=1}^{N} \left( \sqrt{(x_n - x_0)^2 + (y_n - y_0)^2} - R \right) < \text{Threshold1};$$

then, it is determined that there exists the arc-shaped object in the radar scanning range of the robot. If there does not exist N sampling points meeting the first condition, it is determined that there exists no arc-shaped object in the radar scanning range of the robot. In which, the coordinates of the N sampling points can be respectively expressed as $(x_1, y_1)$, $(x_2, y_2), \ldots, (x_n, y_n), \ldots, (x_N, y_N)$, where $1 \leq n \leq N$, and the coordinate of the reference point can be expressed as $(x_0, y_0)$. R is the reference distance, that is, the radius of the arc-shaped object, the specific value can be determined according to the actual needs, for example, it can be set to 15 cm, 20 cm, 25 cm, and the like. $Err1_n$ is the first error value of the sampling point $(x_n, y_n)$, and $Err1_n = \sqrt{(x_n - x_0)^2 + (y_n - y_0)^2} - R$, Threshold1 is the first threshold, the specific value may be determined according to the actual needs, and the value is positively correlated with N, and is positively correlated with R, that is, the greater the value of N is, the greater the value of R is and the greater the value of Threshold1 is. For example, it can be set to 10 cm, 15 cm, 20 cm, and the like.

In another possible implementation of this embodiment, in order to ensure the accuracy of the determination result, in addition to that the N sampling points meet the first condition, it also needs to determine whether the N sampling points meet a preset second condition, wherein the second condition is an average value of one or more second error values being less than a preset second threshold, and the second error value is a square of a difference of the first error value and a reference error value, the reference error value is an average value of the first error value.

If the N sampling points meet the (preset) second condition, the following formula is tenable:

$$\frac{\sum_{n=1}^{N} Err2_n}{N} < \text{Threshold2};$$

that is, the following formula is tenable:

$$\frac{\sum_{n=1}^{N} \left[ \left( \sqrt{(x_n - x_0)^2 + (y_n - y_0)^2} - R \right) - \frac{\sum_{n=1}^{N} \left( \sqrt{(x_n - x_0)^2 + (y_n - y_0)^2} - R \right)}{N} \right]^2}{N} < \text{Threshold2};$$

then, it is determined that there exists the arc-shaped object in the radar scanning range of the robot. If the N sampling points meet the second condition, it is determined that there exists no arc-shaped object in the radar scanning range of the robot. In which, $Err2_n$ is a second error value of the sampling point $(x_n, y_n)$, and $Err2_n = (Err1_n - AvErr)^2$, AvErr is the reference error value, $$AvErr = \frac{\sum_{n=1}^{N} Err1_n}{N},$$

and Threshold2 is the second threshold value, and the specific value may be determined according to actual needs, for example, it may be set to 50 square centimeters, 80 square centimeters, 100 square centimeters, and the like.

In another possible implementation of this embodiment, the charging station may be a concave circular object which facilitates the charging of the robot. Therefore, in order to further ensure the accuracy of the determination result, in addition to that the N sampling points meet the first condition and the second condition, it is also need to determine whether the composed object is convex or concave.

Specifically, first, obtaining a current position point of the robot. In the coordinate system established in this embodiment, the coordinate of the current position of the robot is (0, 0), that is, at the origin position. Then, calculating a first vector from the current position point of the robot to the reference point, where the first vector may be expressed as $(x_0, y_0)$. Furthermore, calculating a second vector from a target sampling point to the reference point, where the target sampling point is any one of the N sampling points, and the second vector may be expressed as $(x_0-x_n, y_0-y_n)$. Finally, determining whether an included angle between the first vector and the second vector is greater than a preset angle threshold. Generally, the angle threshold may be set to 90 degrees, and the first vector and the second vector need to meet the following conditions:

$$x_0(x_0-x_n)+y_0(y_0-y_n)<0;$$

if the condition is met, that is, the included angle between the first vector and the second vector is greater than 90 degrees, which indicates that the object composed of the N sampling points is concave, and it is determined that there exists the arc-shaped object in the radar scanning range of the robot. If the condition is not met, which indicates that the object compose of the N sampling points is convex, and it is determined that there exists no arc-shaped object in the radar scanning range of the robot.

If there exists no arc-shaped object in the radar scanning range of the robot, step S203 is executed, and if the arc-shaped object exists in the radar scanning range of the robot, step S204 is executed.

S203: controlling a chassis of the robot to rotate a preset angle.

The angle may be set according to actual needs, for example, it may be set to 5 degrees, 10 degrees, 20 degrees, or the like. The direction of rotation may be counterclockwise or clockwise. After the chassis of the robot is rotated, it returns to step S201 and subsequent steps, until there exists the arc-shaped object in the radar scanning range of the robot or the time consumption exceeds a preset time threshold. The time threshold may be determined according to actual needs, for example, it may be set to 2 minutes, 5 minutes, 10 minutes, and the like.

S204: determining the arc-shaped object as a charging station.

Figure 5:
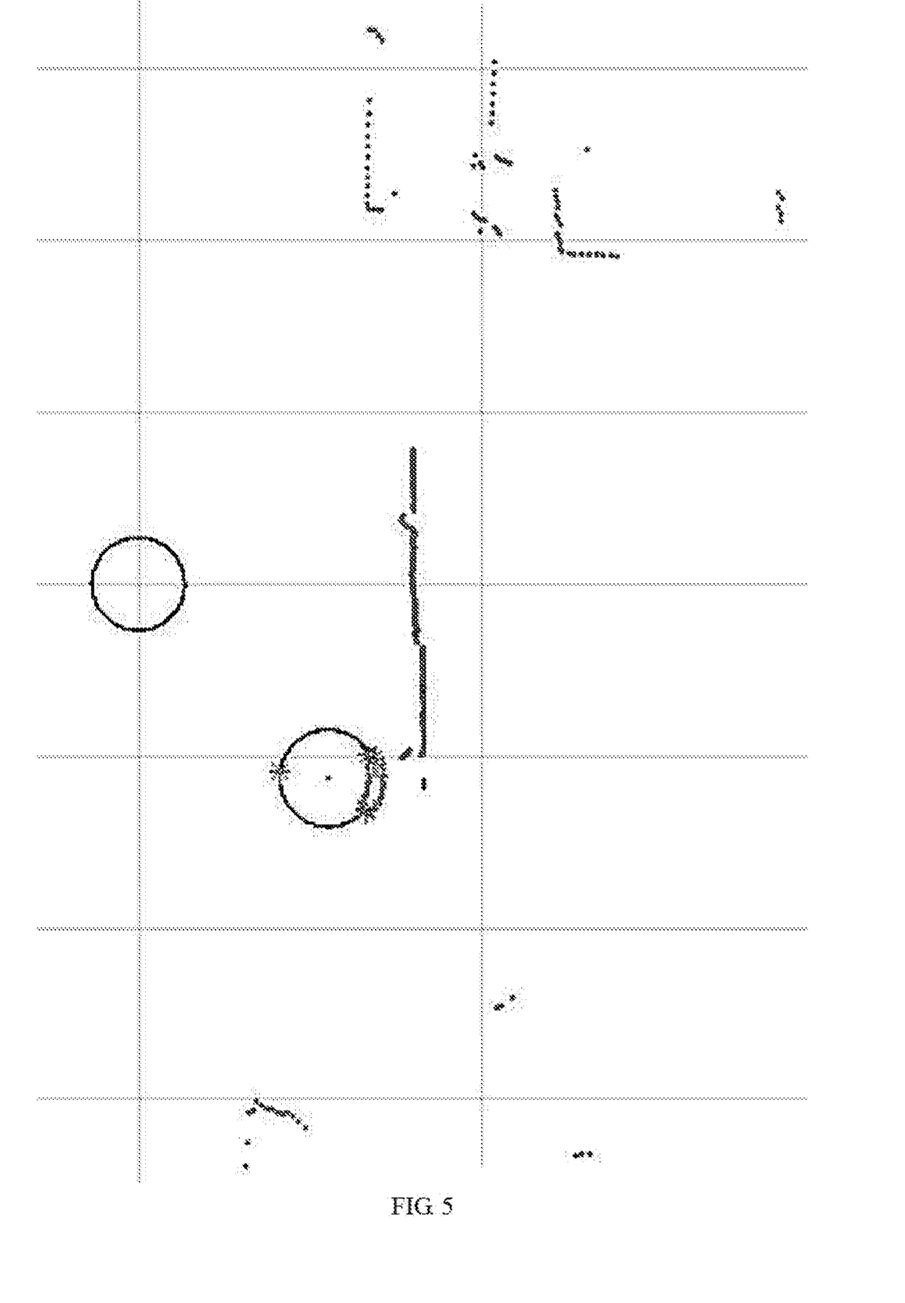
FIG. 5 is a schematic diagram of determining a charging station through the radar scanning data of the robot.

After finding the arc-shaped charging station, the position of the center of an arc of the charging station can be determined, and the target coordinate value and the target rotation angle at which a center of the robot is to be moved can be found. FIG. 5 is a schematic diagram of determining a charging station through the radar scanning data of the robot. For example, if the radius of the arc of the charging station is the same as the radius of the chassis of the robot, as shown in FIG. 5, the coordinate of the center of the arc of the charging station is the target coordinate of the chassis of the robot to be moved to, and the ultimate orientation of the robot relates to the position of the conductive sheet/wheel on the robot, for example, the front of the robot coincides with the front of the charging station when the conductive sheet/wheel is right behind the robot.

In summary, in this embodiment, first, obtaining radar scanning data produced by a radar of the robot; then, determining whether an arc-shaped object exists in a radar scanning range of the radar of the robot based on the radar scanning data; finally, determining the arc-shaped object as a charging station in response to determining that the arc-shaped object exists in the radar scanning range of the robot. Compared with the prior art, this embodiment substitutes the arc identification for the conventional concave-convex structure identification. Since the surface of the arc is relatively smooth, the data jumps at the intersection of the cross-section will not occur, hence the accuracy of charging station identification can be greatly improved.

It should be understood that, the sequence of the serial number of each step in the above-mentioned embodiments does not mean the order of execution, and the order of execution of each process should be determined by its function and internal logic, and should not constitute any limitation on the implementation process of this embodiment.

Figure 6:
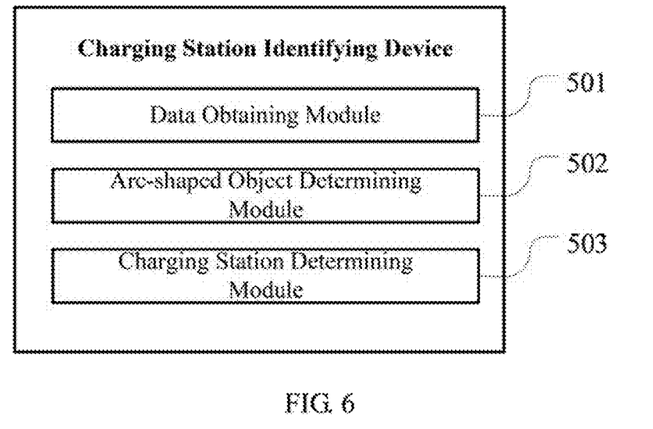
FIG. 6 is a schematic block diagram of a charging station identifying device according to an embodiment of the present disclosure.

FIG. 6 is a schematic block diagram of a charging station identifying device according to an embodiment of the present disclosure. As shown in FIG. 6, the charging station identifying device is applied to a robot, and specifically includes:

a data obtaining module 501 configured to obtain radar scanning data produced by a radar of the robot;

an arc-shaped object determining module 502 configured to determine whether an arc-shaped object exists in a radar scanning range of the radar of the robot based on the radar scanning data; and a charging station determining module 503 configured to determine the arc-shaped object as a charging station in response to determining that the arc-shaped object exists in the radar scanning range of the robot.

Furthermore, the arc-shaped object determining module 502 may include:

a sampling point obtaining unit configured to obtain one or more sampling points from the radar scanning data; and a first determining unit configured to determine whether N sampling points meeting a preset first condition exists, wherein N is an integer greater than 1, and the first condition is a sum of an absolute value of one or more first error values being less than a preset first threshold, the first error value is a difference of a distance between each of the one or more sampling points and a reference point as well as a preset reference distance, and the reference point is any point within the radar scanning range.

Furthermore, the arc-shaped object determining module 502 may further include:

a second determining unit configured to determine whether the N sampling points meet a preset second condition, wherein the second condition is an average value of one or more second error values being less than a preset second threshold, and the second error value is a square of a difference of the first error value and a reference error value, the reference error value is an average value of the first error value.

Furthermore, the arc-shaped object determining module 502 may further include:

a position point obtaining unit configured to obtain a current position point of the robot;

a first vector calculating unit configured to calculate a first vector from the current position point of the robot to the reference point;

a second vector calculating unit configured to calculate a second vector from a target sampling point to the reference point, wherein the target sampling point is any one of the N sampling points;

a third determining unit configured to determine whether an included angle between the first vector and the second vector is greater than a preset angle threshold.

Furthermore, the device may further include:

a chassis rotation module configured to control a chassis of the robot to rotate a preset angle, if there exists no arc-shaped object in the radar scanning range of the robot.

Those skilled in the art can clearly understand that, for the convenience and brevity of the description, the specific operating process of the above-mentioned apparatus (device), module and unit can refer to the corresponding process in the above-mentioned method embodiment, which are not described herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method of a robot comprising a radar, comprising:

obtaining scanning data produced by the radar of the robot, the scanning data indicative of one or more objects and an environment surrounding the robot;

determining whether an arc-shaped object exists in a scanning range of the radar of the robot based on the scanning data;

in response to determining that the arc-shaped object exists in the scanning range of the robot, determining that the arc-shaped object is a charging station;

in response to determining that no arc-shaped object exist in the scanning range of the robot, continuing to obtain scanning data produced by the radar of the robot; and moving the robot to the charging station;
wherein the step of determining whether the arc-shaped object exists in the scanning range of the radar of the robot based on the scanning data comprises:
obtaining one or more sampling points from the scanning data;
determining whether N sampling points meeting a preset first condition exists, wherein N is an integer greater than 1, and the first condition is a sum of an absolute value of one or more first error values being less than a preset first threshold, the first error value is a difference of a distance between each of the one or more sampling points and a reference point as well as a preset reference distance, and the reference point is any point within the scanning range; and
determining that the arc-shaped object exists in the scanning range of the robot, in response to determining that the N sampling points meeting the first condition exist.

2. The method of claim 1, in response to N sampling points meeting the first condition, before the step of determining that the arc-shaped object exists in the scanning range of the robot, further comprising:
determining whether the N sampling points meet a preset second condition, wherein the second condition is an average value of one or more second error values being less than a preset second threshold, and the second error value is a square of a difference of the first error value and a reference error value, the reference error value is an average value of the first error value; and
determining that the arc-shaped object exists in the scanning range of the robot, in response to the N sampling points meeting the preset second condition.

3. The method of claim 2, in response to the N sampling points meeting the preset second condition, before the step of determining that the arc-shaped object exists in the scanning range of the robot, further comprising:
obtaining a current position point of the robot;
calculating a first vector from the current position point of the robot to the reference point;
calculating a second vector from a target sampling point to the reference point, wherein the target sampling point is any one of the N sampling points;
determining whether an included angle between the first vector and the second vector is greater than a preset angle threshold; and
determining that the arc-shaped object exists in the scanning range of the robot, in response to the included angle between the first vector and the second vector being greater than the preset angle threshold.

4. The method of claim 1, further comprising:
controlling a chassis of the robot to rotate a preset angle, and returning to the step of obtaining the scanning data produced by the radar of the robot until the arc-shaped object exists in the scanning range of the robot or a time consumption exceeds a preset time threshold, in response to determining that the arc-shaped object not exists in the scanning range of the robot.

5. A robot, comprising a memory, one or more processors, and one or more computer programs, wherein the one or more computer programs are stored in the memory and configured to be executed by the one or more processors, the one or more programs comprise:
instructions for obtaining scanning data produced by a radar of the robot, the scanning data indicative of one or more objects and an environment surrounding the robot;
instructions for determining whether an arc-shaped object exists in a scanning range of the radar of the robot based on the scanning data;
instructions for determining that the arc-shaped object is a charging station in response to determining that the arc-shaped object exists in the scanning range of the robot;
instructions for continuing to obtain scanning data produced by the radar of the robot in response to not determining that the arc-shaped object exists in the scanning range of the robot; and
instructions for moving the robot to the charging station;
wherein the instructions for determining whether the arc-shaped object exists in the scanning range of the radar of the robot based on the scanning data comprise:
instructions for obtaining one or more sampling points from the scanning data;
instructions for determining whether N sampling points meeting a preset first condition exists, wherein N is an integer greater than 1, and the first condition is a sum of an absolute value of one or more first error values being less than a preset first threshold, the first error value is a difference of a distance between each of the one or more sampling points and a reference point as well as a preset reference distance, and the reference point is any point within the scanning range; and
instructions for determining that the arc-shaped object exists in the scanning range of the robot, in response to determining that the N sampling points meeting the first condition exists.

6. The robot of claim 5, wherein the one or more programs further comprise:
instructions for determining whether the N sampling points meet a preset second condition, wherein the second condition is an average value of one or more second error values being less than a preset second threshold, and the second error value is a square of a difference of the first error value and a reference error value, the reference error value is an average value of the first error value; and
instructions for determining that the arc-shaped object exists in the scanning range of the robot, in response to the N sampling points meeting the preset second condition.

7. The robot of claim 6, wherein the one or more programs further comprise:
instructions for obtaining a current position point of the robot;
instructions for calculating a first vector from the current position point of the robot to the reference point;
instructions for calculating a second vector from a target sampling point to the reference point, wherein the target sampling point is any one of the N sampling points;
instructions for determining whether an included angle between the first vector and the second vector is greater than a preset angle threshold; and
instructions for determining that the arc-shaped object exists in the scanning range of the robot, in response to the included angle between the first vector and the second vector being greater than the preset angle threshold.

8. The robot of claim 5, wherein the one or more programs further comprise:
instructions for controlling a chassis of the robot to rotate a preset angle, and returning to the step of obtaining the scanning data produced by the radar of the robot until the arc-shaped object exists in the scanning range of the robot or a time consumption exceeds a preset time threshold, in response to determining that the arc-shaped object not exists in the scanning range of the robot.

* * * * *